(12) United States Patent
Lee et al.

(10) Patent No.: US 9,041,267 B2
(45) Date of Patent: May 26, 2015

(54) PRELOAD CONTROL DEVICE OF MAGNETIC BEARING

(75) Inventors: Choon-Man Lee, Changwon-Si (KR); Dong-Hyeon Kim, Changwon-Si (KR)

(73) Assignee: CHANGWON NATIONAL UNIVERSITY INDUSTRY ACADEMY COOPERATION CORPS, Changwon-Si (KR)

(*) Notice: Subject to any disclaimer, the term of this patent is extended or adjusted under 35 U.S.C. 154(b) by 197 days.

(21) Appl. No.: 13/992,930

(22) PCT Filed: Apr. 14, 2011

(86) PCT No.: PCT/KR2011/002657
§ 371 (c)(1),
(2), (4) Date: Jun. 10, 2013

(87) PCT Pub. No.: WO2012/077862
PCT Pub. Date: Jun. 14, 2012

(65) Prior Publication Data
US 2013/0257206 A1    Oct. 3, 2013

(30) Foreign Application Priority Data
Dec. 9, 2010   (KR) .............. 10-2010-0125503

(51) Int. Cl.
| | |
|---|---|
| *H02K 7/09* | (2006.01) |
| *B23Q 1/70* | (2006.01) |
| *F16C 25/08* | (2006.01) |
| *F16C 39/06* | (2006.01) |
| *B23Q 1/26* | (2006.01) |
| *F16C 32/04* | (2006.01) |

(52) U.S. Cl.
CPC .............. *H02K 7/09* (2013.01); *F16C 32/0444* (2013.01); *B23Q 1/70* (2013.01); *F16C 25/086* (2013.01); *F16C 39/063* (2013.01); *B23Q 1/265* (2013.01)

(58) Field of Classification Search
CPC ...... H02K 7/09; F16C 32/0444; F16C 39/063
USPC ...................................................... 310/90.5
See application file for complete search history.

(56) References Cited

U.S. PATENT DOCUMENTS

| | | | |
|---|---|---|---|
| 4,551,032 A | 11/1985 | Mottershead | |
| 5,321,329 A * | 6/1994 | Hovorka | 310/90.5 |
| 6,307,292 B1 * | 10/2001 | Brown | 310/90 |
| 7,126,244 B2 * | 10/2006 | Rozmus | 310/90.5 |
| 7,932,656 B2 * | 4/2011 | Ozaki et al. | 310/90.5 |
| 2002/0076127 A1 | 6/2002 | Wu et al. | |

FOREIGN PATENT DOCUMENTS

| | | |
|---|---|---|
| JP | 2008196570 A | 8/2008 |
| JP | 2011239902 A | 12/2011 |
| KR | 100795310 B1 | 1/2008 |

* cited by examiner

*Primary Examiner* — Hanh Nguyen
(74) *Attorney, Agent, or Firm* — Joseph H. Kim; JHK Law

(57) ABSTRACT

The present invention provides a preload control device of a magnetic bearing, which includes a main shaft, a housing, a first magnetic bearing mechanism, a second magnetic bearing mechanism, a pressing mechanism, and a sliding member. The main shaft is rotatably formed in the shape of a rod that is longitudinally long. The housing covers and is fixed outside the main shaft. The first magnetic bearing mechanism is disposed between the housing and the main shaft. The second magnetic bearing mechanism is spaced from the first magnetic bearing mechanism in the axial direction of the main shaft, between the housing and the main shaft. The pressing mechanism is disposed between the second magnetic bearing mechanism and the frusto-conical member. The sliding member is disposed between the pressing mechanism and the second magnetic bearing mechanism.

7 Claims, 3 Drawing Sheets

PRELOAD CONTROL DEVICE OF MAGNETIC BEARING

The present application is a National Stage of PCT/KR2011/002657, filed Apr. 14, 2011, which claims the benefit of Korean Patent Application No. 10-2010-0125503 filed Dec. 9, 2010. The disclosures of those applications are hereby incorporated in their entirety by reference as if fully set forth herein.

BACKGROUND OF THE INVENTION

1. Field of the Invention

The present invention relates to a preload control device of a magnetic bearing, and more particularly, to a preload control device of a magnetic bearing that can automatically apply variable preload to a bearing while a main shaft rotates, by means of a pressing mechanism that circumferentially presses a sliding member due to a centrifugal force.

2. Description of the Related Art

It is required to apply appropriate preload to a ball bearing that supports a main shaft to be rotatable in a housing of machine tools. This is because, in one machine too, low-speed rough machining and high-speed finish machine are performed, large preload is needed to prevent vibration and increase rigidity of a spindle in the low-speed rough machining, and low preload is needed to avoid excessive heat generation due to friction instead of large rigidity in high-speed machining.

In general, switching preloading, multi-step regular position preloading, and automatic variable preloading have been known as a method of controlling preload of a bearing. The switching preloading is a method that changes preload from a regular position to constant pressure when the number of revolutions of a main shaft changes over a predetermined number of revolutions, which has a defect that the rigidity of the main shaft reduces at a middle speed after the preload is changed to the constant pressure. The multi-step preloading is difficult in designing because it is required to sufficiently consider deformation between bearing and deformation of a preloading mechanism in order to accurately set the preload. The automatic variable preloading makes it possible to control preload, using a centrifugal force due to rotation of a main shaft and pressure of a spring. Accordingly, it is possible to control preload without a complicated mechanical configuration or an electric device.

However, it is not enough to use only the elastic force of a spring in order to control preload against a centrifugal force over the elastic force of the spring, such that it is difficult to cope with a wide range of change in rotation speed of a main shaft.

SUMMARY OF THE INVENTION

The present invention relates to a preload control device of a magnetic bearing and an object of the present invention is to provide a preload control device of a magnetic bearing which can automatically apply variable preload to a bearing, using a pressing mechanism circumferentially pressing a sliding member by means of a centrifugal force, when a main shaft rotates.

The present invention provides a preload control device of a magnetic bearing, which includes: a main shaft rotatably formed in the shape of a rod that is longitudinally long and having a frusto-conical member fitted on the outer circumference; a housing covering and fixed outside the main shaft; a first magnetic bearing mechanism disposed between the housing and the main shaft and including first magnetic members allowing the main shaft to rotate at a distance in the housing; a second magnetic bearing mechanism spaced from the first magnetic bearing mechanism in the axial direction of the main shaft, between the housing and the main shaft, including a second magnetic member at a side to allow the main shaft to rotate at a distance in the housing, and providing early preload by sliding toward a frusto-conical member due to a repulsive force generated by the second magnetic member; a pressing mechanism disposed between the second magnetic bearing mechanism and the frusto-conical member, fitted on the outer circumferential surface of the frusto-conical member, and pressed in the circumferential direction of the main shaft by a centrifugal force due to a rotational force of the main shaft; and a sliding member disposed between the pressing mechanism and the second magnetic bearing mechanism and sliding the second magnetic bearing mechanism toward the first magnetic bearing mechanism by means of pressure generated by the pressing mechanism.

The pressing mechanism may include balls coming in contact with the frusto-conical member and the sliding member, and cages retaining the balls to prevent the balls from separating from the frusto-conical member, in which a gap may be formed to allow the ball to be moved in the case by a centrifugal force.

The sliding member may have an inclined surface corresponding to the frusto-conical member so that the second magnetic bearing mechanism is slid toward the first magnetic bearing mechanism by a centrifugal force applied to the balls.

The balls may be returned to the initial position by a repulsive force between the first magnetic bearing mechanism and the second magnetic bearing mechanism, when the centrifugal force applied to the balls reduces with a decrease in rotational force of the main shaft.

The first magnetic bearing mechanism may include a first thrust magnet levitated by a magnetic force between the pair of first magnetic members fixed at a distance from each other on the inner circumferential surface of the housing, and a first radial magnet inserted in the main shaft, at the position corresponding to the first thrust magnet, and the second magnetic bearing mechanism may include a second thrust magnet levitated by a magnetic force toward the frusto-conical member from a second magnetic member disposed on the inner circumferential surface of the housing, close to the first magnetic bearing mechanism, and a second radial magnet inserted in the main shaft, at the position corresponding to the second thrust magnet.

The first and second radial magnets and the first and second thrust magnets may be disposed to be levitated by a magnetic force, respectively.

According to the preload control device of a magnetic bearing of the present invention, since variable preload can be automatically applied to a bearing by a centrifugal force at a pressing mechanism which corresponds to a rotational speed of a main shaft, it is possible to cope with a wide variation of a rotational speed of a main shaft of machine tools, with a simple configuration and a low cost, and precise response is possible.

DETAILED DESCRIPTION OF THE PREFERRED EMBODIMENTS

Hereinafter, exemplary embodiments of the present invention will be described with reference to the accompanying drawings. Prior to this, the terminologies or terms used in the specification and claims should not be construed as being limited to common or dictionary meanings, but be construed as meanings and conceptions that coincide with the spirit of the present invention, on the basis of the basic principle that the inventor(s) may appropriately define the conceptions of the terminologies to explain his/her (their) own invention in the best way.

Figure 1:
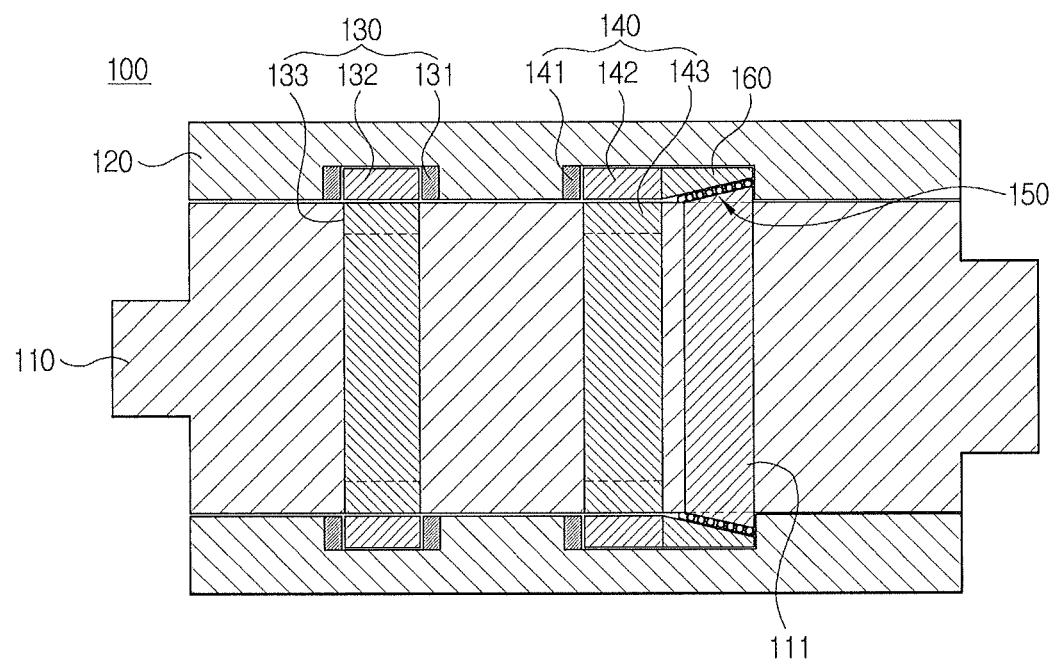
FIG. 1 is a cross-sectional view showing a preload control device of a magnetic bearing according to an embodiment of the present invention.
Figure 2:
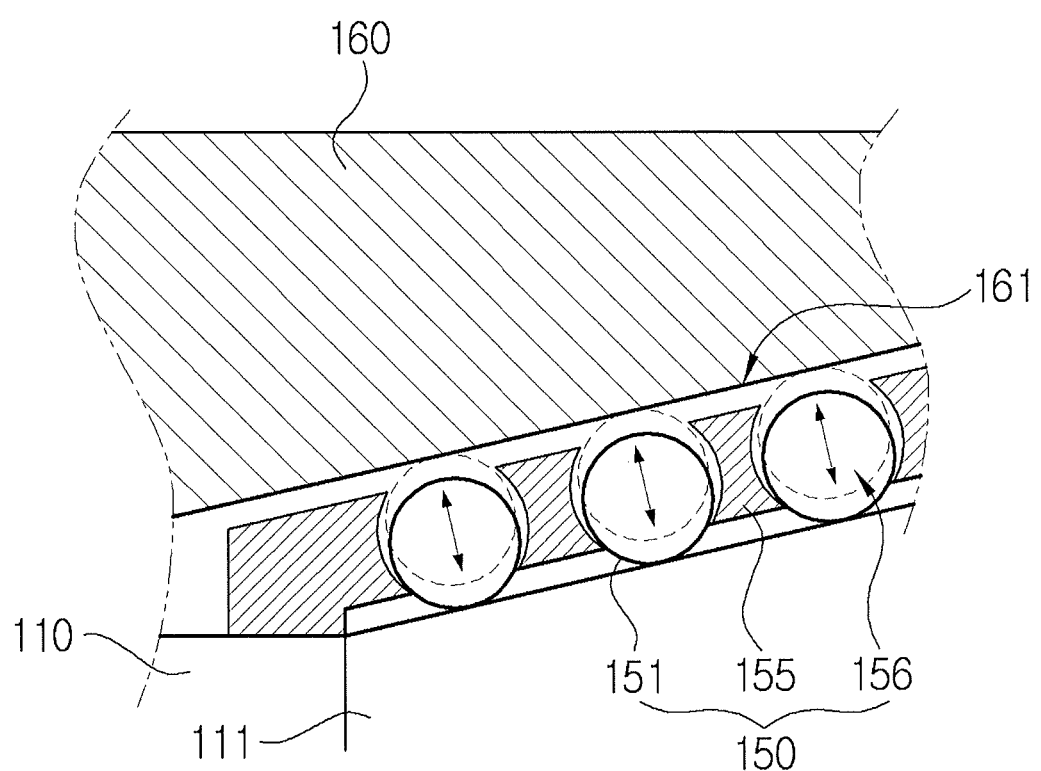
FIG. 2 is a partial enlarged view of the preload control device of a magnetic bearing shown in FIG. 1.

FIG. 1 is a cross-sectional view showing a preload control device of a magnetic bearing 100 according to an embodiment of the present invention and FIG. 2 is a partial enlarged view of the preload control device of a magnetic bearing 100 shown in FIG. 1.

Referring to FIGS. 1 and 2, the preload control device of a magnetic bearing 100 includes: a rotatable main shaft 110; a housing 120 covering and fixed outside the main shaft 110; a first magnetic bearing mechanism 130 supporting rotation of the main shaft 110; a second magnetic bearing mechanism 140 spaced from the first magnetic bearing mechanism 130 in the axial direction of the main shaft 110; a pressing mechanism 150 applying a sliding pressure to the second magnetic bearing mechanism 140; and a sliding member 160 carrying a centrifugal force generated by the pressing mechanism 150 to the second magnetic bearing mechanism 140.

The main shaft 110 is formed in the shape of a rod that is longitudinally long and has a frusto-conical member 111 fitted on the outer circumference. The frusto-conical member 111 is formed such that the diameter gradually decreases toward the second magnetic bearing mechanism 140. Accordingly, the frusto-conical member 111 increases in diameter from the side facing the second magnetic bearing mechanism 140 to the opposite side, protruding from the outer circumferential surface of the main shaft 110.

The first magnetic bearing mechanism 130 includes a pair of first members 131 spaced from each other on the inner circumferential surface of the housing 120, a first thrust magnet 132 levitated by a magnetic force between the pair of first magnetic members 131, and a first radial magnet 133 inserted in the main shaft, at the position corresponding to the first thrust magnet 132.

Since the first thrust magnet 132 is disposed at a predetermined distance between the first magnetic members 131 and the first radial magnet 133 is spaced from the first thrust magnet 132 by a repulsive force, the first magnetic bearing mechanism 130 has a function of supporting the main shaft 110 such that the main shaft 110 can rotate.

In this configuration, the first magnetic bearing mechanism 130 may be implemented by a magnetic member such as a permanent magnet or an electromagnet. Accordingly, friction resistance is never generated and thus a friction coefficient and noise can be absolutely reduced.

The second magnetic bearing mechanism 140 includes a second magnetic member 141 disposed on the inner circumferential surface of the housing 120, close to the first magnetic bearing mechanism 130, a second thrust magnet 142 levitated by a magnetic force toward the frusto-conical member 111 from the second magnetic member 141, and a second radial magnet 143 inserted in the main shaft 110, at the position corresponding to the second thrust magnet 142. In this configuration, the second thrust magnet 142 can slide by a distance $\Delta d$ from the outer circumferential surface of the second radial magnet 143.

A repulsive force is generated between the second magnetic member 141 and the second thrust magnet 142 and the second radial magnet 143 is spaced from the second thrust magnet 142 by the repulsive force and has a function of supporting the main shaft 110 such that the main shaft can rotate. In this configuration, the second magnetic bearing mechanism 140 may be implemented by a magnetic member such as a permanent magnet or an electromagnet. Accordingly, friction resistance is never generated and thus a friction coefficient and noise can be absolutely reduced.

The second magnetic member 141 is disposed at a side of the second thrust magnet 142 and the sliding member 160 at the other side. The sliding member 160 slides with the second magnetic bearing mechanism 140. The sliding member 160 provides early preload to the pressing mechanism 150 by means of the repulsive force between the second magnetic member 141 and the second thrust magnet 142 and is slid with the second thrust magnet 142 in the direction in which the early preload applied to the main shaft 110 reduces, by a centrifugal force applied to the pressing mechanism 150 due to a rotational force of the main shaft 110.

The sliding member 160 has an inclined surface 161 corresponding to the angle of the frusto-conical member 111 and the pressing mechanism 150 is disposed between the inclined surface 161 and the frusto-conical member 111.

The pressing mechanism 150 includes balls 151 that come in contact with the frusto-conical member 111 and the sliding member 160 and cages 155 retaining the balls 151 on the frusto-conical member 111.

The balls 151 are metal balls and preferably made of metal having a relatively large specific gravity.

The cages 155 are arranged along the outer circumferential surface of the frusto-conical member 111 and rotate with the main shaft 110, when the main shaft 110 rotates. Obviously, the cages 155 may be disposed in the inclination direction of the frusto-conical member 111.

The cage 155 may be formed such that the ball 151 can protrude from the top and the bottom of the cage 155, but it prevents the ball 151 from separating. Accordingly, a hole 156 in which the ball 151 can move is formed through the cage 155.

The hole 156 is formed such that the vertical diameter of the cage 155 is smaller than the ball 151 and the maximum diameter at the center of the hole 156 is large than the diameter of the ball 151, and accordingly, a gap that allows the ball 151 can move in the hole 156 in the circumferential or central direction of the main shaft 110 is defined.

Further, the hole 156 may be formed through the cage 155 in the direction of the centrifugal force applied to the ball 151, that is, in the circumferential direction of the main shaft 110, corresponding to the inclination angle of the frusto-conical member 111.

Therefore, when a centrifugal force is applied to the ball 151 with rotation of the pressing mechanism 150, pressure is transmitted to the inclined surface 161, and the sliding member 160 and the second thrust magnet 142 slide toward the first magnet bearing mechanism 130.

Hereinafter, a method of operating the preload control device of a magnetic bearing 100 according to an embodiment of the present invention is described with reference to the accompanying drawings.

Figure 3:
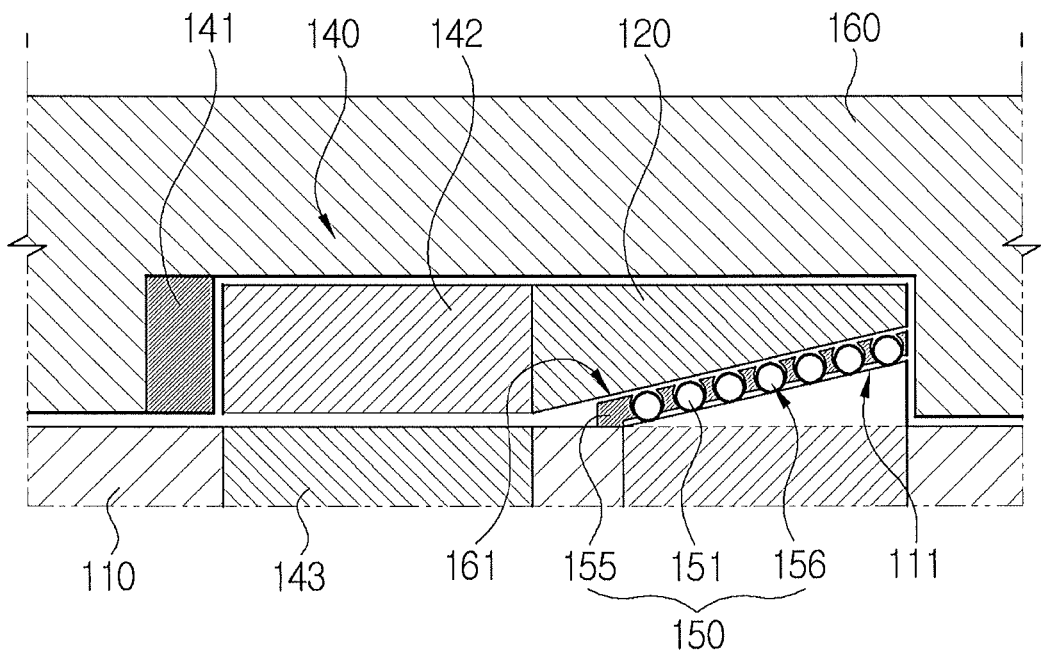
FIGS. 3 and 4 are cross-sectional views showing the preload control device of a magnetic bearing shown in FIG. 1 which is in operation.
Figure 4:
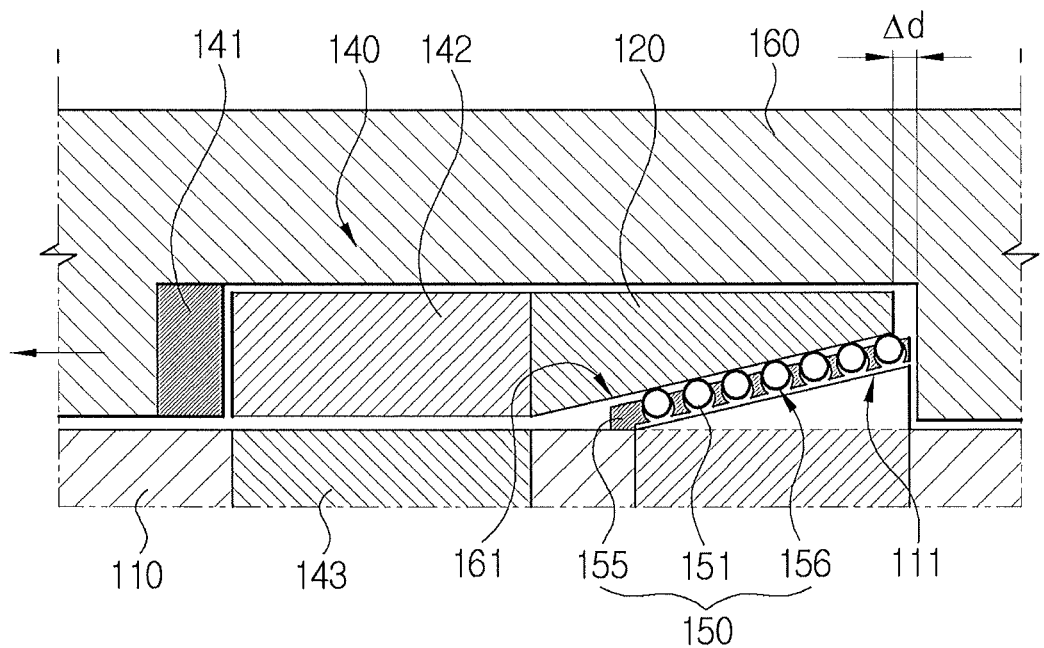

FIGS. 3 and 4 are cross-sectional views showing the preload control device of a magnetic bearing 100 shown in FIG. 1 which is in operation.

Referring to FIGS. 3 and 4, with the main shaft 110 stopped, gaps are generated by the repulsive force between the first thrust magnet 131 and the first radial magnet 132 and between the second thrust magnet 141 and the second radial magnet 142. The repulsive force between the second magnetic member 141 and the second thrust magnet 142 presses the sliding member 160 and thus early preload is applied to the pressing mechanism 150.

When the main shaft 110 rotates at a low speed, a centrifugal force is applied to the balls 151 by the rotational force of the main shaft 110 and the balls 151 move to the inclined surface 161, in the holes 156, and as the rotational force of the main shaft 110 gradually increases, the force of the balls 151 which pushes the inclined surface 161 increases.

Therefore, while the main shaft 110 rotates at a low speed, the rotation of the main shaft 110 can be made stable by the early preload due to the repulsive force between the second magnetic member 141 and the second thrust magnet 142.

When the main shaft 110 rotates at a speed over a predetermined RPM, the inclined surface 161 of the sliding member 160 is pushed by the centrifugal force applied to the balls 161, such that the sliding member 160 and the second thrust magnet 142 slide by the distance Δd toward the first magnetic member 131, and accordingly, the preload applied to the pressing mechanism 150 reduces.

Therefore, it is possible to reduce a friction force at the pressing mechanism 150 by reducing the preload at the second magnetic bearing mechanism 140 by means of the centrifugal force applied to the balls 151 while the main shaft 110 rotates at a high speed, and accordingly, it is possible to reduce maintenance cost and time.

When the centrifugal force applied to the balls 151 reduces with a decrease in rotational force of the main shaft 110, the second thrust magnet 142 and the sliding member 160 is returned to the initial positions by the repulsive force between the second magnetic member 141 and the second thrust magnet 142.

Therefore, the preload control device of a magnetic bearing 100 according to an embodiment of the present invention can automatically control preload at the second magnetic bearing mechanism 140 by means of a centrifugal force generated at the pressing mechanism 150.

Although the present invention was described with reference to the embodiment shown in the drawings, but it is just an example and those skilled in the art would understand that various modifications and equivalents may be implemented from the present invention. Therefore, the protective range of the present invention should be determined by the spirit described in claims.

According to the preload control device of a magnetic bearing of the present invention, since the variable preload can be automatically applied to the bearing by the centrifugal force at the pressing mechanism which corresponds to the rotational speed of the main shaft, it is possible to cope with a wide range of rotational speed of a main shaft for machine tools, and the present invention can be used for the main shaft for machine tools in various fields by precise response.

What is claimed is:

1. A preload control device of a magnetic bearing, comprising:
    a main shaft rotatably formed in the shape of a rod that is longitudinally long and having a frusto-conical member fitted on the outer circumference;
    a housing covering and fixed outside the main shaft;
    a first magnetic bearing mechanism disposed between the housing and the main shaft and including first magnetic members allowing the main shaft to rotate at a distance in the housing;
    a second magnetic bearing mechanism spaced from the first magnetic bearing mechanism in the axial direction of the main shaft, between the housing and the main shaft, including a second magnetic member at a side to allow the main shaft to rotate at a distance in the housing, and providing early preload by sliding toward a frusto-conical member due to a repulsive force generated by the second magnetic member;
    a pressing mechanism disposed between the second magnetic bearing mechanism and the frusto-conical member, fitted on the outer circumferential surface of the frusto-conical member, and pressed in the circumferential direction of the main shaft by a centrifugal force due to a rotational force of the main shaft; and
    a sliding member disposed between the pressing mechanism and the second magnetic bearing mechanism and sliding the second magnetic bearing mechanism toward the first magnetic bearing mechanism by means of pressure generated by the pressing mechanism.

2. The preload control device of claim 1, wherein the pressing mechanism includes
    balls coming in contact with the frusto-conical member and the sliding member, and
    cages retaining the balls to prevent the balls from separating from the frusto-conical member, and
    a gap is formed to allow the ball to be moved in the case by a centrifugal force.

3. The preload control device of claim 2, wherein the sliding member has an inclined surface corresponding to the frusto-conical member so that the second magnetic bearing mechanism is slid toward the first magnetic bearing mechanism by a centrifugal force applied to the balls.

4. The preload control device of claim 3, wherein the balls are returned to the initial position by a repulsive force between the first magnetic bearing mechanism and the second magnetic bearing mechanism, when the centrifugal force applied to the balls reduces with a decrease in rotational force of the main shaft.

5. The preload control device of claim 2, wherein the balls are returned to the initial position by a repulsive force between the first magnetic bearing mechanism and the second magnetic bearing mechanism, when the centrifugal force applied to the balls reduces with a decrease in rotational force of the main shaft.

6. The preload control device of claim 1, wherein the first magnetic bearing mechanism includes
    a first thrust magnet levitated by a magnetic force between the pair of first magnetic members fixed at a distance each other on the inner circumferential surface of the housing, and
    a first radial magnet inserted in the main shaft, at the position corresponding to the first thrust magnet, and
    the second magnetic bearing mechanism includes
    a second thrust magnet levitated by a magnetic force toward the frusto-conical member from a second magnetic member disposed on the inner circumferential surface of the housing, close to the first magnetic bearing mechanism, and
    a second radial magnet inserted in the main shaft, at the position corresponding to the second thrust magnet.

7. The preload control device of claim 6, wherein the first and second radial magnets and the first and second thrust magnets are disposed to be levitated by a magnetic force, respectively.

* * * * *